(12) United States Patent
Decroupet

(10) Patent No.: US 7,037,588 B2
(45) Date of Patent: May 2, 2006

(54) SOLAR CONTROL GLAZING

(75) Inventor: Daniel Decroupet, Fosses-la-Ville (BE)

(73) Assignee: Glaverbel, Jumet (BE)

(*) Notice: Subject to any disclaimer, the term of this patent is extended or adjusted under 35 U.S.C. 154(b) by 0 days.

(21) Appl. No.: 10/759,434

(22) Filed: Jan. 20, 2004

(65) Prior Publication Data

US 2004/0147185 A1    Jul. 29, 2004

Related U.S. Application Data

(63) Continuation of application No. 09/572,454, filed on May 17, 2000, now abandoned, which is a continuation of application No. PCT/EP98/07209, filed on Nov. 6, 1998.

(30) Foreign Application Priority Data

Nov. 19, 1997  (EP) ................ 97203602.4

(51) Int. Cl.
*B32B 9/00* (2006.01)

(52) U.S. Cl. ............ 428/428; 428/432; 359/359; 359/360; 359/361

(58) Field of Classification Search ........ 428/428, 428/432; 359/359, 360, 361
See application file for complete search history.

(56) References Cited

U.S. PATENT DOCUMENTS 5,948,538 A * 9/1999 Brochot et al. ............ 428/432
5,965,246 A   10/1999 Guiselin et al.

FOREIGN PATENT DOCUMENTS

| EP | 0 718 250 A2 | 6/1996 |
| EP | 0 761 618 A1 | 3/1997 |
| EP | 0 792 847 A1 | 9/1997 |
| EP | 0 718 250 | 5/1998 |
| JP | 10-217378 * | 8/1998 |
| JP | 10217378 | 8/1998 |

* cited by examiner

*Primary Examiner*—Rena Dye
*Assistant Examiner*—Timothy M. Speer
(74) *Attorney, Agent, or Firm*—Akerman Senterfitt

(57) ABSTRACT

A solar control panel comprises a glazing substrate and a solar control coating in which the solar control panel exhibits a luminous transmittance of less than 70%, a direct energy transmittance of less than 40% and a dominant wavelength in reflection of less than 510 nm and in which the solar control coating comprises in sequence at least: a first antireflective layer; a first infrared reflecting layer; a first barrier layer; a second antireflective layer; a second infrared reflecting layer; a second barrier layer; and a third antireflective layer; and in which the solar control coating comprises at least one additional light absorbing layer spaced from each of the barrier layers.

24 Claims, No Drawings

US 7,037,588 B2

SOLAR CONTROL GLAZING

CROSS-REFERENCE TO RELATED APPLICATIONS

This application is a continuation of U.S. patent application Ser. No. 09/572,454 filed May 17, 2000, now abandoned, which is a continuation of International Application No. PCT/EP98/07209 filed Nov. 06, 1998, which are incorporated reference. Additionally, this application claims priority based upon European Application No. EP 97203602,4 filed Nov. 19, 1997, which is incorporated by reference.

BACKGROUND OF THE INVENTION

This invention relates to solar control glazing, particularly, but not exclusively, for architectural applications.

Solar control glazing may be used to control one or more of the following properties of a glazing panel:

a) direct energy transmittance (DET) i.e. the proportion of the solar energy transmitted directly through a substrate as a percentage of the incident solar energy;

b) solar factor (SF) i.e. the solar energy that is transmitted through a substrate (including the energy absorbed by the substrate and emitted by the substrate towards the interior) as a percentage of the incident solar energy;

c) luminous transmittance (LT) i.e. the luminous flux transmitted through a substrate as a percentage of the incident luminous flux;

d) luminous reflectance (RL) i.e. the luminous flux reflected from a substrate as a percentage of the incident luminous flux;

e) selectivity i.e. the ratio of the luminous transmittance to the solar factor (LT/SF).

f) purity (p) of the colour i.e. the excitation purity specified according to a linear scale on which a defined white light source has a purity of zero and the pure colour has a purity of 100%. The purity of the coated substrate is measured from the side opposite the coated side.

g) dominant wavelength ($\lambda_D$) i.e. the peak wavelength in the range transmitted or reflected by the substrate.

These and other properties of glazing panels as referred to herein are based on the standard definitions of the International Commission on Illumination—*Commission Internationale de l'Eclairage* ("CIE"). Unless otherwise stated, values herein are given with respect to standard CIE illuminant C (which represents average daylight having a colour temperature of 6700°K) for a clear, approximately 6 mm thick glass substrate arranged as a single glazing sheet. The colour co-ordinates referred to herein are measured on the Hunter scale.

Solar control glazing usually consists of a glass substrate which carries a solar filter. One particular known type of solar filter consists of the following layers (in order):

1) a metal oxide layer 200 Å to 400 Å thick
2) an infra-red reflecting metal layer 50 Å to 200 Å thick
3) a barrier layer
4) a metal oxide layer 400 Å to 800 Å thick
5) an infra-red reflecting metal layer 50 Å to 200 Å thick
6) a barrier layer
7) a metal oxide layer 200 Å to 400 Å thick The thicknesses of the various layer can be varied over a wide range and the figures given above are merely to indicate a general order of magnitude.

SUMMARY OF THE INVENTION

In this structure;

the infra-red reflecting metal layers are typically silver or a silver alloy; their principal role in the filter is to reflect solar energy in the infra-red portion of the spectrum whilst transmitting a significant portion of the incident visible light the metal oxides layers may be, for example, tin oxide, zinc oxide, titanium oxide, bismuth oxide, tantalum oxide, indium oxide or mixtures thereof; their role in the filter is to reduce the amount of visible light reflected by the silver layers, to provide a physical protection for the silver layers and to prevent oxidation of the silver layers when exposed to the atmosphere. These layers are substantially non-absorbent.

the principal role of each barrier is to prevent undesired oxidation of its immediately underlying silver layer, particularly when the overlying metal oxide layer is deposited by magnetron sputtering of a metal target in an oxidising atmosphere. They may be omitted entirely if the manufacturing process is such that the silver layers are not degraded during manufacture of the filter. The barriers are kept as thin as possible so as to have no effect, or only a negligible effect, upon the solar properties of the glazing. The barriers are typically metal, partially oxidised metal, or metal oxide layers. Where, for example, the barrier is sputter deposited metal and the overlying dielectric is a sputter deposited metal oxide, the metal barrier is oxidised throughout the majority of its thickness when the overlying metal oxide is deposited, thus protecting the silver layer from oxidation and forming an additional, thin dielectric layer. Titanium, niobium, nickel chrome and zinc are commonly used as barriers in this way. A thickness of perhaps 1 Å or 2 Å may remain as unoxidised metal adjacent the underlying silver layer. In any case, the thickness and amount of oxidation of the barrier layer is controlled such that the residual absorption of the barrier layer in the visible portion of the spectrum is less than 2% and preferably less than 1%. The barrier layers may merge into their overlying dielectric layers. For example, if the barrier is titanium deposited in metallic form and the overlying antireflective layer is titanium dioxide deposited by sputtering a titanium target in an oxidising atmosphere then the barrier will be substantially oxidised during deposition of the antireflective layer. In this case there may not be a clearly discernible boundary between the barrier layer and the antireflective layer. The same is true if, for example, the barrier layer is a sputtered layer of titanium dioxide or sub-stoichiometric titanium dioxide with a titanium dioxide antireflective layer or if the barrier is metallic zinc with an overlying zinc oxide anti-reflective layer.

For some applications, particularly architectural applications in which relatively large glazing surfaces are used, it is desirable to provide glazing units, usually as double glazing units, which transmit a significant portion of the incident visible light (to provide good interior visibility with natural light) whilst preventing passage of a significant portion of the incident solar energy (to avoid overheating the interior). For example, it is desirable in certain applications to have a glazing sheet with a luminous transmittance in the order of 66% and a direct energy transmittance in the order of 38% or less. Such a glazing sheet can be assembled as a double glazing unit to provide a luminous transmittance in the order of 60% and a solar factor in the order of 30%. Such high selectivity glazing units, which have a selectivity greater than about 1.7 and preferably greater than about 1.8, can be considered to be a particular species of solar control panel.

As well as affecting the direct energy transmittance and the luminous transmittance of a glazing sheet, a solar filter must confer an aesthetically acceptable colour to the glazing and be both technically and economically feasible to produce on an industrial scale. Many solar glazing panels are produced by magnetron sputter deposition of the solar filter on a glass substrate. Development of a new coating installation requires considerable investment. Consequently, the ability to manufacture a new filter using existing plant with minimum modification and delay and the flexibility of being able to manufacture a range of different products using a single manufacturing installation is a significant advantage.

The filter structure described above may be used to produce a glazing pane having a luminous transmittance in the order of 70% with a direct energy transmittance of greater than 40%. The exact properties may be varied by changing the thicknesses and/or nature of the layers.

Increasing the thickness of the silver layers will, in general, increase the amount of incident radiation that is reflected by the filter and thus reduce both TL and DET. However, increasing the thickness of one or each of the silver layer to such an extent as to obtain a direct energy transmittance below about 40% results in the appearance of the glazing becoming undesirably metallic rather than substantially neutral. Indeed, it is for this reason that the structure described above uses two spaced silver layers rather than a single, thicker silver layer.

An alternative modification might be to add a third infra-red reflecting silver layer with overlying barrier and metal oxide layers to the double silver layer structure described above. This would require significant modification to existing coaters and/or add considerably to the process time and consequently to the cost of producing such a filter.

Additional, optional features are defined in the dependent claims.

The substrate is preferably glass and the solar control coating may be deposited directly onto the substrate, preferably by sputtering which may be magnetically enhanced. Unless otherwise specified, one or more additional layers may be provided above and/or below and/or between the layers which are defined.

The nature and thicknesses of the layers making up the solar control coating may be chosen to produce one or more of:
  a) a combination of relatively low transmission of solar energy and relatively low reflection of visible light
  b) a substantially neutral colour in reflection and in transmission with colour purity values in the order of 1%
  c) good angular stability.

Angular stability, i.e. substantially constant reflected colour irrespective of the angle at which a glazing panel is viewed is particularly desirable for architectural application in which large glazing surfaces are used and may be improved by use of the additional absorbing layer of the present Invention, especially when this is positioned directly underneath an infra-red reflecting layer.

A glazing panel in accordance with the invention may have a selectivity greater than about 1.7, preferably greater than about 1.8.

The invention may be used to provide a glazing panel which is substantially neutral in reflection, in which case the colour purity may be less than 10%, or a glazing panel which is blue or bluish in reflection. In each case, this provides a glazing panel which is aesthetically acceptable, particularly for architectural applications. The dominant wavelength in reflection is preferably less than 510 nm and is preferably greater than 465 nm.

Depositing of the infra-red reflecting layer may be facilitated by depositing his on the additional absorbing layer, particularly when this is a metal or metal alloy layer.

The additional light absorbing layer may be titanium in metallic form. Titanium targets are commonly used in existing coating installations, particularly for depositing titanium barrier layers. Use of titanium as the additional fight absorbing layer may provide the desired characteristics for this layer whilst, in addition, simplifying the production process. Alternatively, the additional light absorbing layer may comprise at least one material selected from the group consisting of (a) tin in metallic form, (b) chrome in metallic form, (c) an alloy of nickel and chrome in metallic form, (d) stainless steel in metallic form, (e) a nitride, (f) a nitride of stainless steel, (g) titanium nitride, (h) zirconium nitride, (i) a carbide.

The antireflective layers may comprise, for example, zinc oxide, tin oxide, titanium oxide or a mixed oxide of stainless steel. A particular advantage of a mixed oxide of stainless steel which may be used to increase the selectivity of the coating is its slight absorption in the blue portion of the visible spectrum. The human eye is not particularly sensitive to this portion of the spectrum so that absorbing radiation in his portion of the spectrum reduces the direct energy transmittance more than it reduces the luminous transmittance.

A suitable amount of absorption may be achieved by arranging for the additional absorbing layer to have a geometrical thickness of at least nm. The additional absorbing layer may have a geometrical thickness of at 5 nm. The additional absorbing layer to have a geometrical thickness of at least 10 nm.

One or more of the antireflective layers may comprise discrete layers of one or more oxides, for example a first layer of tin oxide and a second overlying layer of zinc oxide, a first layer of zinc oxide and a second overlying layer of tin oxide, a first layer of zinc oxide a second overlying layer of tin oxide and a third overlying layer of zinc oxide. Such structures may increase the abrasion resistance of the coating.

One or more additional layers may be incorporated into the solar control coating. For example, an abrasive resistant overcoat of silicon oxide or titanium oxide may be provided. Alternatively or additionally, a primer layer, for example silicon oxide, may be provided directly adjacent to the substrate surface and/or beneath one or more of the infra-red reflecting layers.

One aspect of the invention relates to enabling a new and particularly desirable set of optical properties to be obtained on a commonly used general structure of a solar filter. This aspect of the invention may enable such properties to be obtained with little or no modification of common manufacturing equipment.

DETAILED DESCRIPTION OF THE INVENTION

Non-limiting examples of the present invention will now be described:

EXAMPLE 1

A solar control panel produced by magnetron sputtering consists of the following sequential layers on a 6 mm thick glass substrate:

a first antireflective zinc oxide layer having a thickness of about 349 Å deposited by sputtering a zinc target in an oxidising atmosphere;

a first infra-red reflecting silver layer having a thickness of about 93 Å deposited by sputtering a silver target in an inert argon atmosphere;

a first barrier layer deposited by sputtering about a 30 Å thickness of titanium metal from a titanium target in an inert argon atmosphere substantially all of which is subsequently oxidised during deposition of the overlying antireflective layer so that the residual absorption of this barrier is less than about 1%;

a second antireflective zinc oxide layer having a thickness of about 849 Å deposited by sputtering a zinc target in an oxidising atmosphere;

an absorbing layer of metallic titanium having a thickness of about 12 Å deposited by sputtering a titanium target in an inert argon atmosphere;

a second infra-red reflecting silver layer having a thickness of about 170 Å deposited by sputtering a silver target in an inert argon atmosphere;

a second barrier layer deposited by sputtering about a 35 Å thickness of titanium metal from a titanium target in an inert argon atmosphere substantially all of which is subsequently oxidised during deposition of the overlying antireflective layer so that the residual absorption of this barrier is less than about 1%; and a third anti-reflective zinc oxide layer having a thickness of about 308 Å deposited by sputtering a zinc target in an oxidising atmosphere.

The properties of this glazing panel are;

| luminous transmittance | 65% | |
| direct energy transmittance | 38% | |
| reflection of visible light | 9.5% | |
| colour co-ordinates in reflection | a* = 1.1 | b* = −12.7 |
| dominant wavelength in reflection | 476 nm | |
| colour purity in reflection | 21% | |
| dominant wavelength in transmission | | 509 nm |
| colour purity in transmission | | 1.9% |

A sealed double glazing unit comprising the glazing panel of Example 1 spaced 15 mm from a 6 mm thick sheet of clear glass has the following properties:

| luminous transmittance | 59% | |
| solar factor | 31% | |
| reflection of visible light | 13% | |
| colour co-ordinates | a* = −0.3 | b* = −11 |
| dominant wavelength in reflection | 477 nm | |
| colour purity in reflection | 18% | |
| dominant wavelength in transmission | | 521 nm |
| colour purity in transmission | | 1.7% |

In accordance with standard practice, the solar control filter is arranged in position 2 in the double glazing unit i.e. at the interior of the glazing unit (to protect it from abrasion and exposure to the atmosphere) on the sheet of the glazing unit that is exposed to the exterior. This is also the case for the other examples given below.

The glazing of this example has a pleasant, blue appearance in reflection.

EXAMPLE 2

By way of comparison, Example 2 relates to a solar control glazing panel which does not form part of the invention and which consists of the solar control glazing panel of Example 1 with the omission of the absorbent titanium layer.

This properties of this glazing panel are:

| luminous transmittance | 73.5% | |
| direct energy transmittance | 43.5% | |
| reflection of visible light | 10.7% | |
| colour co-ordinates in reflection | a* = −0.3 | b* = −8.5 |
| dominant wavelength in reflection | 478 nm | |
| colour purity in reflection | 15% | |
| dominant wavelength in transmission | | 545 nm |
| colour purity in transmission | | 6.5% |

A sealed double glazing unit comprising the glazing panel of Example 2 spaced 15 mm from a 6 mm thick sheet of clear glass has the following properties:

| luminous transmittance | 65% | |
| solar factor | 35% | |
| reflection of visible light | 15% | |
| colour co-ordinates | a* = −1.1 | b* = −7 |
| dominant wavelength in reflection | 480 nm | |
| colour purity in reflection | 12% | |
| dominant wavelength in transmission | | 545 nm |
| colour purity in transmission | | 2.7% |

The luminous transmittance and solar factor of the double glazing unit using the glazing of Example 2 are higher than those of Example 1. In addition, the Example 2 glazing is undesirably yellow in transmission.

EXAMPLE 3

A solar control panel was produced by magnetron sputtering of the following sequential layers on a 6 mm thick glass substrate:

a first antireflective layer comprising a layer of zinc oxide having a thickness of about 197 Å deposited by sputtering a zinc target in an oxidising atmosphere, a layer of mixed "stainless steel" oxide having a thickness of about 25 Å deposited by subsequently sputtering a stainless steel target in an oxidising atmosphere and a layer of zinc oxide having a thickness of about 58 Å deposited by subsequently sputtering a zinc target in an oxidising atmosphere;

a first infra-red reflecting silver layer having a thickness of about 157 Å deposited by sputtering a silver target in an inert argon atmosphere;

a first barrier layer deposited by sputtering about a 30 Å thickness of titanium metal from a titanium target in an inert argon atmosphere substantially all of which is subsequently oxidised during deposition of the overlying antireflective layer so that the residual absorption of this barrier is less than about 1%;

a second antireflective zinc oxide layer having a thickness of about 825 Å deposited by sputtering a zinc target in an oxidising atmosphere;

an absorbing layer of metallic titanium having a thickness of about 13 Å deposited by sputtering a titanium target in an inert argon atmosphere;

a second infra-red reflecting sliver layer having a thickness of about 130 Å deposited by sputtering a silver target in an inert argon atmosphere;

a second barrier layer deposited by sputtering about a 30 Å thickness of titanium metal from a titanium target in an inert argon atmosphere substantially all of which is subsequently oxidised during deposition of the overlying antireflective layer so that the residual absorption of this barrier is less than about 1%; and a third anti-reflective zinc oxide layer having a thickness of about 309 Å deposited by sputtering a zinc target in an oxidising atmosphere.

This glazing panel had the following properties:

| | | | |
|---|---|---|---|
| luminous transmittance | 62% | | |
| direct energy transmittance | 35% | | |
| reflection of visible light | 12% | | |
| colour co-ordinates in reflection | a* = 0.0 | b* = −2.2 | |
| dominant wavelength in reflection | 477 nm | | |
| colour purity in reflection | 3.7% | | |
| dominant wavelength in transmission | | 512 nm | |
| colour purity in transmission | | 3% | |

A sealed double glazing unit comprising the glazing panel of Example 3 spaced 15 mm from a 6 mm thick sheet of clear glass has the following properties:

| | | | |
|---|---|---|---|
| luminous transmittance | 56% | | |
| solar factor | 28% | | |
| reflection of visible light | 15% | | |
| colour co-ordinates in reflection | a* = −1 | b* = −2.6 | |
| dominant wavelength in reflection | 482 nm | | |
| colour purity in reflection | 5.3% | | |
| dominant wavelength in transmission | | 518 nm | |
| colour purity in transmission | | 1.6% | |

Example 3 shows a glazing having a particularly desirable luminous transmittance and solar factor for certain application which is substantially neutral in colour in both reflection and transmissions

EXAMPLE 4

A solar control panel was produced by magnetron sputtering of the following sequential layers on a 6 mm thick glass substrate:

a first antireflective layer comprising a layer of zinc oxide having a thickness of about 321 Å deposited by sputtering a zinc target in an oxidising atmosphere an absorbing layer of metallic titanium having a thickness of about 30 Å deposited by sputtering a titanium target in an inert argon atmosphere;

a first infra-red reflecting silver layer having a thickness of about 157 Å deposited by sputtering a silver target in an inert argon atmosphere;

a first barrier layer deposited by sputtering about a 30 Å thickness of titanium metal from a titanium target in an inert argon atmosphere substantially all of which is subsequently oxidised during deposition of the overlying antireflective layer so that the residual absorption of this barrier is less than about 1%;

a second antireflective comprising a layer of zinc oxide having a thickness of about 780 Å deposited by sputtering a zinc target in an oxidising atmosphere;

a second infra-red reflecting silver layer having a thickness of about 158 Å deposited by sputtering a silver target in an inert argon atmosphere;

a second barrier layer deposited by sputtering about a 30 Å thickness of titanium metal from a titanium target in an inert argon atmosphere substantially all of which is subsequently oxidised during deposition of the overlying antireflective layer so that the residual absorption of this barrier is less than about 1%; and a third anti-reflective zinc oxide layer having a thickness of about 330 Å deposited by sputtering a zinc target in an oxidising atmosphere.

This glazing panel had the following properties:

| | | | |
|---|---|---|---|
| luminous transmittance | 56% | | |
| direct energy transmittance | 32% | | |
| reflection of visible light | 11% | | |
| colour co-ordinates in reflection | a* = 0 | b* = −4 | |
| dominant wavelength in reflection | 477 nm | | |
| colour purity in reflection | 7% | | |
| dominant wavelength in transmission | | 485 nm | |
| colour purity in transmission | | 6% | |

A sealed double glazing unit comprising the glazing panel of Example 3 spaced 15 mm from a 6 mm thick sheet of clear glass has the following properties:

| | | | |
|---|---|---|---|
| luminous transmittance | 51% | | |
| solar factor | 26% | | |
| reflection of visible light | 13% | | |
| colour co-ordinates in reflection | a* = −0.8 | b* = −4.5 | |
| dominant wavelength in reflection | 480 nm | | |
| colour purity in reflection | 8% | | |
| dominant wavelength in transmission | | 487 nm | |
| colour purity in transmission | | 6% | |

The invention claimed is:

1. A solar control panel comprising a glazing substrate and a solar control coating in which the solar control panel exhibits a luminous transmittance of less than 70%, a direct energy transmittance of less than 40% and a dominant wavelength in reflection of less than 510 nm and in which the solar control coating comprises, in sequence from the glazing substrate at least:

a first antireflective layer adjacent;
a first infra-red reflecting layer;
a first barrier layer;
a second antireflective layer;
a second infra-red reflecting layer;
a second barrier layer; and
a third antireflective layer;
characterized in that the solar control coating comprises at least one additional light absorbing layer spaced from each of the barrier layers.

2. A solar control panel in accordance with claim 1 in which the additional light absorbing layer comprises titanium in metallic form.

3. A solar control panel in accordance with claim 1 in which the additional light absorbing layer has a geometrical thickness of at least 5 Å.

4. A solar control panel in accordance with claim 1 in which the additional light absorbing layer is positioned in the solar control coating such that it directly underlies one of the infra-red reflecting layers.

5. A solar control panel in accordance with claim 4 in which the additional light absorbing layer is positioned in the solar control coating such that it underlies the second infra-red reflecting layer.

6. A solar control panel in accordance with claim 1 in which the additional light absorbing layer is responsible for a reduction in the luminous transmittance of the panel of at least 4% and a reduction in the direct energy transmittance of the panel of at least 3%.

7. A solar control panel in accordance with claim 1 in which the solar control coating has no more than two spaced infra-red reflecting layers.

8. A solar control panel in accordance with claim 1 in which at least one of the antireflective layers comprises at least one layer of a metal oxide.

9. A laminated glazing unit comprising a solar control panel in accordance with claim 1 in combination with at least one additional glazing panel.

10. A multiple glazing unit comprising a solar control panel in accordance with claim 1 in combination with at least one additional glazing panel.

11. A method of manufacturing a solar control panel that exhibits a luminous transmittance of less than 70%, a direct energy transmittance of less than 40% and a dominant wavelength in reflection of less than 510 nm, comprising the steps of:
   providing a glazing substrate;
   providing a solar control coating on said glazing substrate, in which the solar control coating comprises, in sequence from the glazing substrate at least;
   a first antireflective layer adjacent;
   a first infra-red reflecting layer;
   a first barrier layer;
   a second antireflective layer;
   a second infra-red reflecting layer;
   a second barrier layer; and
   a third antireflective layer;
   and in which the solar control coating comprises at least one additional light absorbing layer spaced from each of the barrier layers.

12. A solar control panel in accordance with claim 1 in which the at least one additional light absorbing layer has a thickness in the range of about 5 Å to about 30 Å.

13. A solar control panel in accordance with claim 1 in which the first and third antireflective layers have a thickness in the range of about 200 Å to about 400 Å, the second antireflective layer has a thickness in the range of about 400 Å to about 800 Å, and the first and second infra-red layers have a thickness in the range of about 50 Å to about 200 Å.

14. A solar control panel in accordance with claim 13 in which the at least one additional light absorbing layer has a thickness in the range of about 5 Å to about 30 Å.

15. A method in accordance with claim 11 in which the at least one additional light absorbing layer has a thickness in the range of about 5 Å to about 30 Å.

16. A method in accordance with claim 11 in which the first and third antireflective layers have a thickness in the range of about 200 Å to about 400 Å, the second antireflective layer has a thickness in the range of about 400 Å to about 800 Å, and the first and second infra-red layers have a thickness in the range of about 50 Å to about 200 Å.

17. A method in accordance with claim 16 in which the at least one additional light absorbing layer has a thickness in the range of about 5 Å to about 30 Å.

18. A solar control panel in accordance with claim 1, in which the solar control panel exhibits a luminous transmittance of less than 67% and a direct energy transmittance of less than 39%.

19. A solar control panel in accordance with claim 1, in which the solar control panel exhibits a luminous transmittance of less than 64% and a direct energy transmittance of less than 37%.

20. A solar control panel in accordance with claim 1, in which the solar control panel exhibits a luminous transmittance of less than 58% and a direct energy transmittance of less than 34%.

21. A solar control panel in accordance with claim 4, in which the additional light absorbing layer is positioned in the solar control coating such that it underlies the first infra-red reflecting layer.

22. A solar control panel in accordance with claim 10, in which the solar control panel exhibits a luminous transmittance of less than 62% and a direct energy transmittance of less than 32%.

23. A solar control panel in accordance with claim 10, in which the solar control panel exhibits a luminous transmittance of less than 58% and a direct energy transmittance of less than 30%.

24. A solar control panel in accordance with claim 10, in which the solar control panel exhibits a luminous transmittance of less than 53% and a direct energy transmittance of less than 28%.

* * * * *